(12) United States Patent
Govindaraj et al.

(10) Patent No.: US 6,510,361 B1
(45) Date of Patent: Jan. 21, 2003

(54) COMPUTER NUMERICAL CONTROL UTILIZING SYNCHRONIZED LOGIC EXECUTION IN AN OPEN COMPUTER PLATFORM

(75) Inventors: Subbian Govindaraj, South Euclid, OH (US); Stephen L. Steh, Mentor, OH (US); James L. Martin, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/494,005

(22) Filed: Jan. 28, 2000

(51) Int. Cl.[7] ............................................. G06F 19/00
(52) U.S. Cl. ...................... 700/180; 700/169; 700/181; 700/182

(58) Field of Search .................... 700/17, 18, 180–182, 700/160, 169; 710/15, 18; 707/501; 709/200

(56) References Cited

U.S. PATENT DOCUMENTS 6,282,454 B1 * 8/2001 Papadopoulos et al. ....... 700/83

* cited by examiner

Primary Examiner—Paul P. Gordon
(74) Attorney, Agent, or Firm—Robert A. Van Someren; Alexander M. Gerasimow; William R. Walbrun

(57) ABSTRACT

A computer numerical control system for controlling and monitoring machine motion. The CNC system combines a CNC executive and a logic engine for controlling execution of a part program. The logic engine is capable of executing under an operating system of a personal computer. The logic engine is coupled to the CNC executive such that the logic application can be executed in synchronization with the CNC executive.

20 Claims, 8 Drawing Sheets

COMPUTER NUMERICAL CONTROL UTILIZING SYNCHRONIZED LOGIC EXECUTION IN AN OPEN COMPUTER PLATFORM

FIELD OF THE INVENTION

The present invention relates generally to a computer numerical control, and particularly to a computer numerical control that uses a logic engine executing under a personal computer operating system for its logic and input/output requirements.

BACKGROUND OF THE INVENTION

A variety of controls are used to monitor and control various types of machine motion. For example, processor-based controls, such as computer numerical controls (CNCs), are used to control the motion of machines, such as machine tools. Machine tools are used in a variety of manufacturing environments. Within these environments, a CNC may be used to control the movements of a cutter, for example, on a machine tool when machining a part or component for use in the manufacture of a given product.

CNC-type controllers have become popular due, in part, to their adaptability and relative ease-of-use in controlling machine motion. When machining a part, for example, a machine motion control program can be loaded into the CNC which then causes the machine to move according to the commands established by the part program (motion control program). The control is designed to read the part program instructions and provide appropriate outputs to the various servos, stepper motors, etc. that physically move the components of the machine.

The CNC also may be used to monitor multiple items related to motion control. For example, in a closed loop system, a variety of sensors are disposed on the machine to provide outputs to the CNC indicative of various parameters, such as position and speed. The CNC compares the sensed parameters with the programmed parameters to detect and correct for any error between the values. As is understood by those of ordinary skill in the art, CNC-type controllers are able to process a wide variety of data related to controlling machine motion, monitoring machine motion, storing and manipulating part program data, etc.

Traditionally, CNCs have been configured in various ways depending on the CNC design established by the CNC manufacturer and/or end user. For example, CNCs typically have included a visual interface, such as a CRT, and a keyboard that allow machine control programs to be entered or edited directly at the CNC. In some systems, machine control programs can be prepared off site at a workstation, such as a personal computer, that is configured to permit an operator to prepare motion control programs in language syntax that is recognizable and useable by the CNC. The program is then loaded onto a storage medium, such as a punch tape, magnetic tape or diskette, and physically taken to the CNC where it is downloaded for use by the CNC in controlling machine motion. For some applications, the program may be transferred electronically from the personal computer to the CNC for execution. In any of these situations, the motion control program must be prepared in a format recognizable and useable by the CNC, and its execution is controlled solely by the CNC.

Simultaneously with the development of CNC-type machine controllers, personal computers and personal computer operating systems have evolved. Both CNC controllers and personal computers have independently been designed to process logic applications. Each type of system utilizes what is commonly known as a logic engine to process logic related functions. However, a logic engine executing under a standard operating system of a personal computer has not been used as a sole logic engine to control the logic functions of a CNC. The traditional CNC has utilized its own logic engine based on the custom or proprietary CNC system.

In a typical CNC controller, a CNC executive controls execution of the motion control part program blocks. However, each of the part program blocks is subjected to the control of a logic engine that ultimately decides whether it is appropriate for a given part program block to be executed. Certain part program commands or operations require synchronization of part program block execution with the scan frequency of the logic engine. With other part program blocks, however, it may not be necessary for the CNC controlled block execution to be synchronized with the scan rate of the logic engine. Because of unique CNC programming and operating systems as well as the necessary cooperation between the CNC executive and the logic engine, logic engines that execute based on personal computer operating systems have not been amenable to synchronous part program execution.

It would be advantageous to be able to utilize a logic engine that executes on a personal computer operating system in combination with a CNC executive for part program execution. This would allow the ready use of a wider variety of logic applications in a CNC environment.

SUMMARY OF THE INVENTION

The present invention relates to a computer numerical control system for controlling and monitoring machine motion. The system includes a CNC executive and a personal computer. The personal computer has a logic engine that executes under an operating system of the personal computer. The logic engine is operatively coupled to the CNC executive such that a logic application can be executed in synchronization with the CNC executive.

According to another aspect of the present invention, a system is provided for controlling manipulation of a component, such as a part. The system includes a machine tool connectable to the component. Additionally, a CNC executive is coupled to the machine tool to provide commands that control activity of the machine tool in manipulating the component. The system further includes a logic engine capable of executing under a personal computer operating system. The logic engine is disposed in communication with the CNC executive for cooperation therewith.

According to another aspect of the present invention, a method is provided for executing a part program on a machine. The method includes utilizing a logic application based on a personal computer operating system. The method further includes providing a CNC executive capable of executing at least a portion of the part program. Also, the method includes synchronizing the execution of the logic application with the execution of the portion of the part program.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

In this section, a system is described in which a CNC module utilizes a logic engine executing under a standard operating system of a personal computer as the only logic engine for the logic and input/output requirements of the computer numerical control. This permits the use of a wider variety of logic applications, including editors, compilers, interpreters, execution engines, monitors, etc., that can be written for execution on a standard personal computer operating system and utilized with a CNC motion control system. This section also describes preferred, exemplary CNC system designs and the cooperation between the logic engine and the CNC executive.

Figure 1:
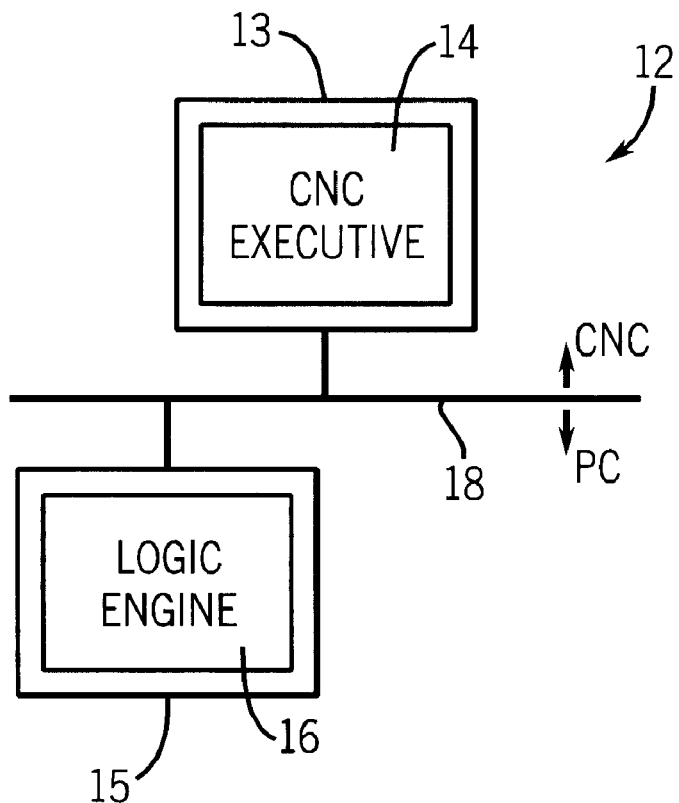
FIG. 1 is a schematic view of a control system utilizing a CNC executive coupled to a logic engine executing under a personal computer operating system, according to a preferred embodiment of the present invention.

Referring generally to FIG. 1, an exemplary CNC system 12 is illustrated according to a preferred embodiment of the present invention. CNC system 12 includes a CNC module 13 having a CNC executive 14 communicatively coupled to a logic module 15 having a logic engine 16. CNC executive 14 preferably is designed for controlling the motion of machines, such as machine tools, while logic engine 16 is personal computer based and designed for executing under a standard operating system (e.g. WindowsNT™) of a personal computer. The specific CNC executive 14 and logic engine 16 should be designed such that logic execution in the personal computer environment begins and finishes in synchronization with the foreground motion execution on CNC module 14, as will be explained more fully below.

CNC module 13 may be communicatively coupled to logic module 15 across a variety of data communication links 18. For example, data communication link 18 may comprise a network, such as a wide area network or local area network. Another exemplary data communication link 18 comprises a data bus, such as a PCI bus. For example, CNC executive 14 may be mounted on a PCI card and inserted in a PCI slot of a personal computer for communication with the logic engine of the personal computer across a PCI data bus 18. As described in FIGS. 2 through 4, one preferred system utilizes a personal computer-based workstation in which the personal computer is coupled to the CNC module through a PCI slot, and the CNC module, in turn, is coupled to a machine for machine motion control.

Figure 2:
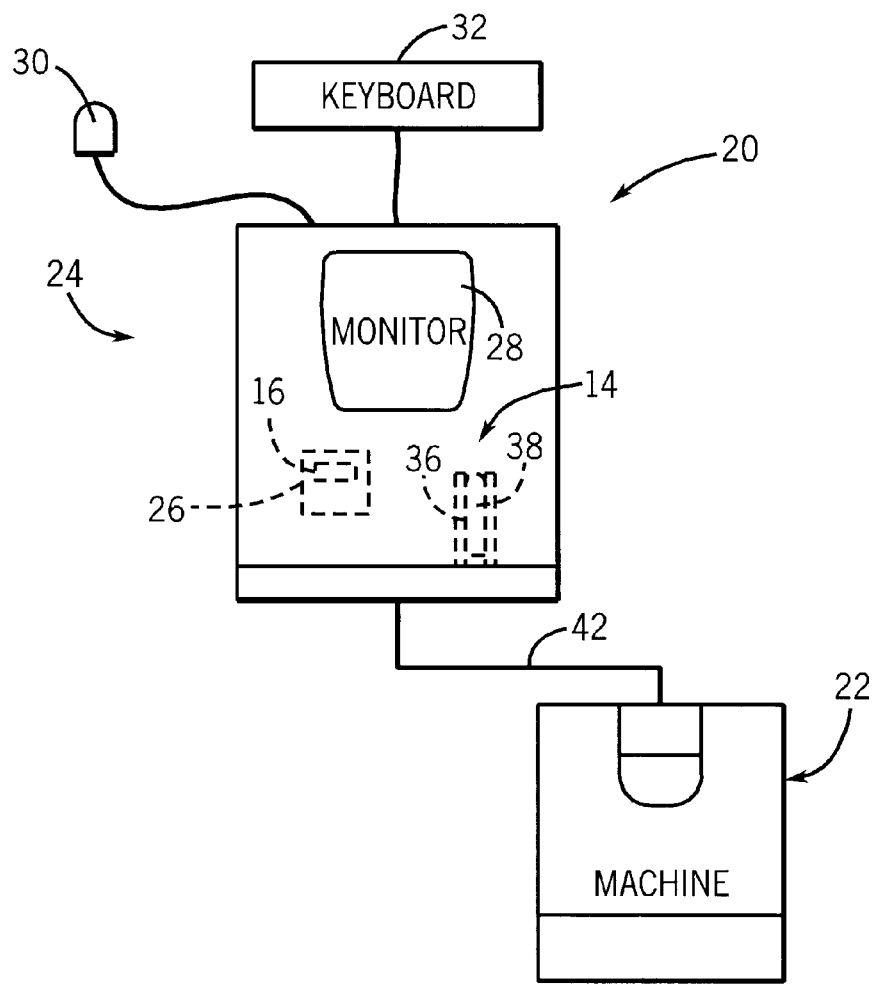
FIG. 2 is a schematic view of one embodiment of the present invention in which a computer numerical control is resident on a personal computer.

Referring generally to FIG. 2, an exemplary workstation 20 is illustrated in communication with a machine 22, such as a machine tool. Workstation 20 preferably comprises a personal computer 24 that may be of a variety of standard configurations. An exemplary personal computer 24, however, includes logic engine 16 embodied in a processor 26 configured with a PENTIUM™ or later generation processor rated at 75 MHz or higher. The exemplary PC also has at least twenty megabytes of RAM and at least thirty megabytes of available hard disk space. The exemplary PC further includes either a VGA or SVGA monitor 28, a mouse 30 and a keyboard 32 for entering data.

Furthermore, workstation 20 comprises a common operating system, such as a Windows-based operating system or a UNIX operating system. Preferably, workstation 20 comprises a Windows-based operating system and includes a Windows-based software package, such as WindowsNT.

In this exemplary embodiment, workstation 20 also includes CNC executive 14. CNC executive 14 is resident on workstation 20, and specifically it is resident on personal computer 24. Workstation 20 is designed to permit communication between personal computer 24, logic engine 16 and the resident CNC 14 via a common operating system, such as the Windows-based operating system discussed above. This permits the input and viewing of machine control parameters and the input of logic applications through a familiar application program interface. Effectively, there exists a seamless connectivity between the personal computer with its conventional operating system and the CNC. Additionally, CNC executive 14 and logic engine 16 can be utilized in controlling machine 22, while other common applications are run on personal computer 24.

In one preferred embodiment, communications between personal computer 24, e.g. processor 26, and CNC executive 14 are via a standard PCI slot 36 of personal computer 24. CNC 14 is mounted on a PC card 38 that is inserted into PCI slot 36 for communication with logic engine 16.

Figure 3A:
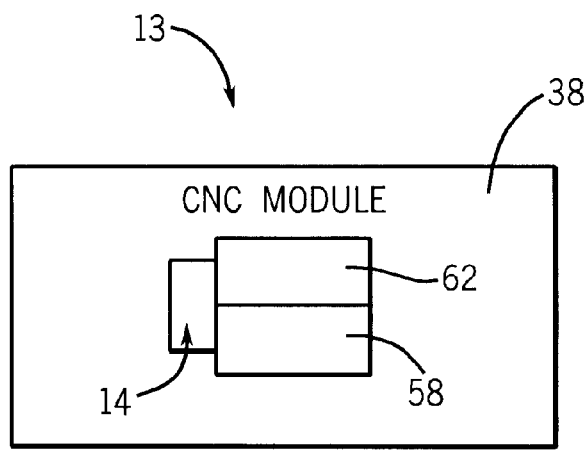
FIG. 3A is a schematic representation of a computer numerical control mounted on a PC card.
Figure 3:
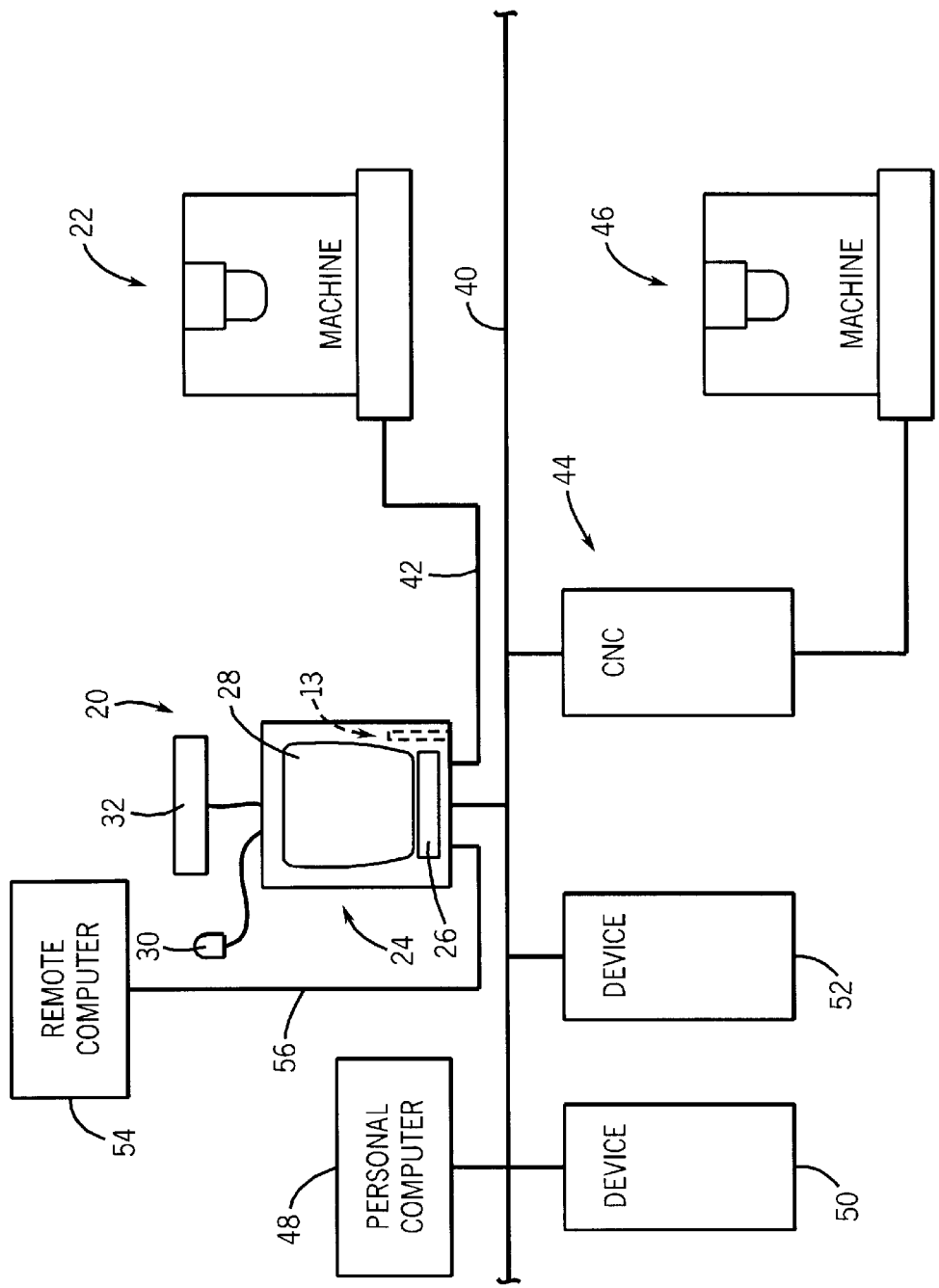
FIG. 3 is a schematic view of the workstation of FIG. 2 networked with other devices.

As illustrated in FIG. 3, workstation 20 can also be designed for linking with other devices via a network 40. In this exemplary implementation of the present invention, workstation 20 utilizes an open control interface and a standard process-to-process communication protocol in a commonly used operating system. However, workstation 20 translates the process-to-process communication protocol to a CNC compatible protocol or vice versa, allowing communication with networked CNCs, such as CNC 44. CNC 44 may be a conventional stand alone CNC or combined with a personal computer into a single workstation, such as workstation 20. Each additional CNC, such as CNC 44, can be used to control one or more additional machines, such as machine 46. It should be noted that workstation 20, and specifically CNC executive 14 and logic engine 16, may be coupled to machine 22, by a dedicated control line 42. Also, workstation 20 may control machine 46 via CNC 44 through the network 40. Potentially, network 40 also can serve as data communication link 18 to permit communication between CNC executive 14 and logic engine 16 across network 40.

Use of standard operating systems and process-to-process communication protocols also permits workstation 20 to communicate with other personal computers, such as personal computer 48. Additionally, workstation 20 can communicate with other devices, e.g. devices 50 and 52, such as other CNCs, printers, sensor devices, instruments, etc. for the exchange of data.

In the preferred embodiment, the process-to-process communication protocol is the Dynamic Data Exchange (DDE) communications protocol which permits one DDE-compliant Windows application to communicate with other DDE-compliant Windows applications linked to network 40. However, workstation 20 may be adapted to use other application programming interfaces, such as "C" Application Programming Interface (CAPI) or Object Linking and Embedding (OLE) automation, that also can be adapted to accomplish desired process-to-process communication. Because of their different protocols, CNCs traditionally have not been amenable for communication with such application programming interfaces that utilize, for example, Windows-based applications. Thus, the adaptability and flexibility of Windows-based operating systems have not been sufficiently available in CNC environments.

Furthermore, network 40 may comprise a variety of network types, e.g., WANs or LANs, but in most applications it is a local area network (LAN). For example, network 40 preferably is an Ethernet TCP/IP network that is readily useable for the linking of multiple personal computers, CNCs and other devices, applications and workstations.

Also, a remote computer 54 may be coupled to workstation 20 by a serial line 56. Remote computer 54 can be used both for control and monitoring of CNC executive 14 in cooperation with workstation 20. For example, an operator interface can be utilized at computer 54 to control CNC 14. Also, computer 54 can be used in cooperation with workstation 20 to perform software upgrades, failure assessment, diagnostics, etc. Effectively, personal computer 24 is utilized as a server for remote computer 54. Preferably, the open control interface utilized by workstation 20 is DHCP compatible to facilitate connection of remote computer 54 via network 40 for such upgrades, failure assessment and diagnostic procedures to be performed on CNC executive 14 or logic engine 16. The open architecture and the networkability of the various devices provides users with great system flexibility.

Referring to FIG. 3A, the preferred CNC module 13 includes one or more processors 58 that are able to receive data from personal computer 24 and logic engine 16 and to communicate data back to personal computer 24 and logic engine 16. The CNC executive 14, along with processor 58, also executes commands, e.g. part program commands, and monitors the motion and other parameters of a machine under its control. Part programs and other data can be loaded into a CNC memory 62. An exemplary CNC module is a 9/PC CNC available from Allen-Bradley Company, L. L. C., located at 1201 South Second Street, Milwaukee Wisc. However, CNC module 13 potentially can be selected from a variety of types or brands of computer numerical controls.

Figure 4:
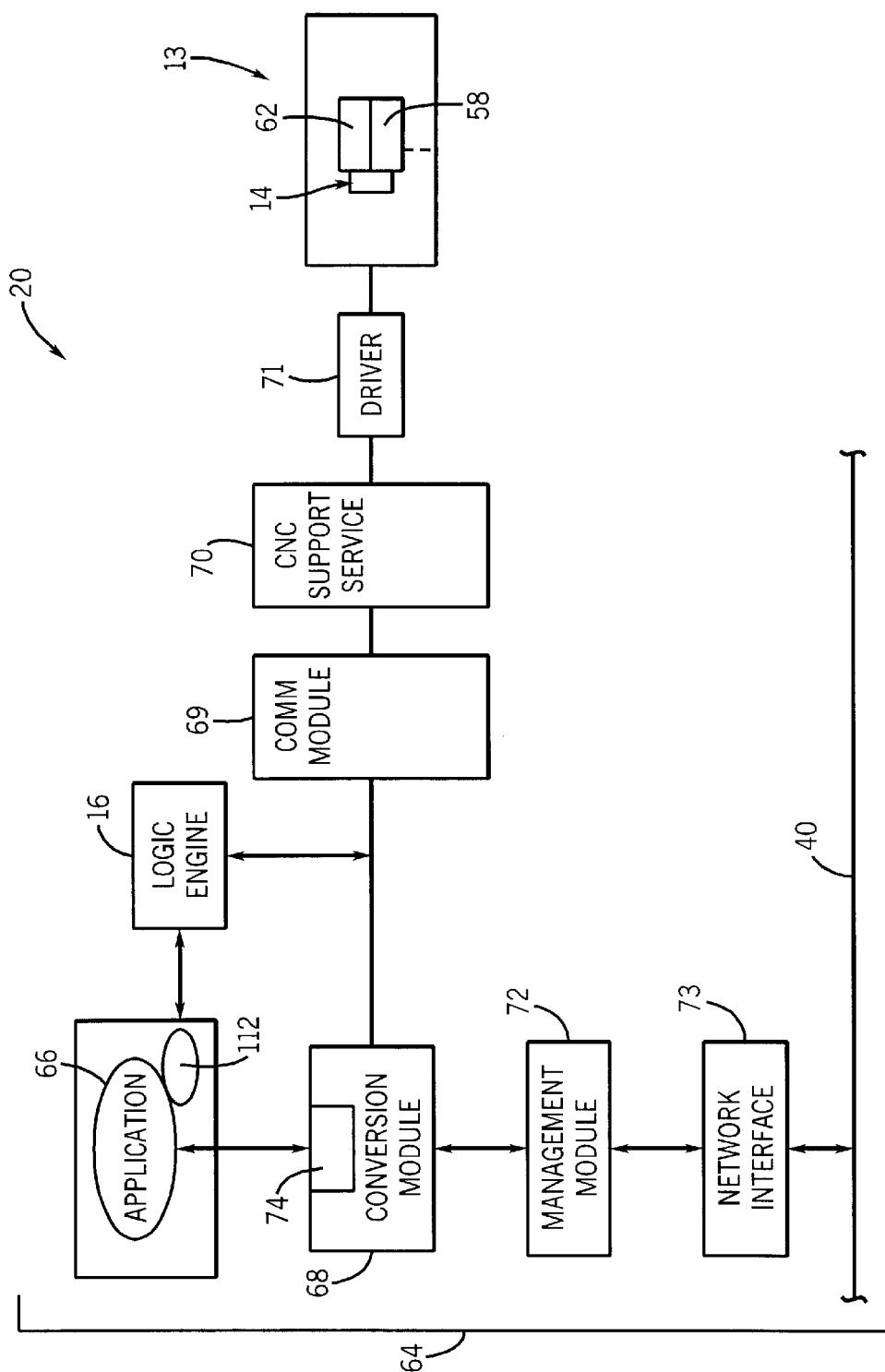
FIG. 4 is an illustration of a portion of an open control interface adapted to communicate with a computer numerical control, according to a preferred embodiment of the present invention.

Referring generally to FIG. 4, an exemplary embodiment of a preferred open architecture of workstation 20 will be further described. In this preferred embodiment, it should be assumed that a Windows-based operating system, preferably WindowsNT Version 4.0 or higher, is utilized along with the Dynamic Data Exchange process-to-process communication protocol. Thus, workstation 20 is configured for DDE-compliant Windows applications. However, the present invention should not be construed as limited to this configuration and is adaptable to other versions of Windows and/or UNIX or other workstation-based operating system, other compatible process-to-process communication protocols and other network types.

Personal computer 24 uses an open control interface 64 that utilizes a Windows-based operating system. In the preferred embodiment, open control interface 64 combines a WindowsNT™ operating system with Dynamic Data Exchange communication protocol so that a variety of DDE-compliant Windows-based applications, e.g. a DDE-compliant Windows application 66, may be used on workstation 20. An exemplary architecture is described in co-pending application Ser. No. 09/406,657, filed Sep. 27, 1999, entitled Multiple Connection Architecture For Communication With A Computer Numerical Control Resident In A Workstation And Other Networked Computer Numerical Controls, that is commonly assigned.

The DDE-compliant application 66 communicates with a conversion module 68 which converts DDE protocol communications/data entered at the DDE-compliant Windows application 66 to a CNC-compatible protocol. Additionally, conversion module 68 converts data received from CNC module 13 into DDE-compliant data that is passed back to DDE-compliant application 66.

Conversion module 68 communicates with resident CNC module 13 via a communications API/DLL (Dynamic Link Library) module 69 coupled to a CNC support service 70 and an appropriate driver 71, such as a 9/PC PCI driver. Communication module 69, support service 70 and driver 71 permit the transfer of data between conversion module 68 and resident CNC module 13 for both the monitoring and control of CNC module 13. Depending on the overall design of CNC module 13, logic engine 16 and open control interface 64, the configuration of modules 69, 70 and 71 may change. However, a preferred exemplary communications module 69, CNC support service module 70 and driver 71 are available as a software installation, 9/PC Software Installation CD catalog number: 8520-LMEX, from the Allen-Bradley Company.

In an exemplary embodiment in which the open architecture system utilizes WindowsNT, the CNC communications module 69 provides the interface functions that are used by the WindowsNT application for transacting CNC communications. An exemplary CNC support service module 70 comprises a user mode WindowsNT service that serves as the interface between other user mode applications and the kernel mode device driver that communicates with the CNC. In this same exemplary system, driver 71 is a 9/PC PCI Driver that comprises a WindowsNT kernel mode device driver. This driver interfaces from WindowsNT to the CNC using the PCI bus for communications. In this embodiment, user mode WindowsNT applications, including logic applications, use the driver 71 to conduct transactions with the CNC executive 14.

Furthermore, conversion module 68 cooperates with a communication management module 72, preferably a client server, which effectively manages data flow between conversion module 68 and an appropriate network interface 73 so that, when desired, data supplied from conversion module 68 may be encoded for transmission across network 40. For example, the client server 72 may encapsulate validated DDE requests provided to conversion module 68; place them into appropriate parameterized CNC command protocols; and send them over network 40 to the appropriately addressed CNC, such as CNC 44. In this preferred embodiment, network 40 is an Ethernet network and network interface 73 comprises a TCP/IP compatible Ethernet card, such as the Etherlink III™ card distributed by 3Com Corporation. Communication management module 72 handles both data from conversion module 68 that is sent to networked CNCs and data communicated from the networked CNCs to conversion module 68.

In the preferred embodiment, conversion module 68 is a data server. An exemplary data server for use with a CNC, such as the Allen-Bradley 9/Series CNC, is the 9/Series OCI Data Server, Catalog No. 8520-IFP1, that utilizes a software module 74 referred to as the RSServer Tool Kit™ module to facilitate translation to the appropriate DDE or CNC protocol used in this exemplary system. The 9/Series OCI Data Server is available from the Allen-Bradley Company, and the RSServer Tool Kit™ is available under Catalog No. 9355WABOEMM, from Rockwell Software, Inc., a subsidiary of Allen-Bradley Company, L. L. C. and located at 6680 Beta Drive, Cleveland, Ohio. Additionally, in this embodiment, a preferred communication management module 72 also is available from Rockwell Software and is referred to as the RSLinx™ software, Catalog No. 9355WABOEMM.

The combination of conversion module 68, communications module 69, support service 70, driver 71, communication management module 72 and network interface 73 provides for the selective reading and writing of data as well as the communication of commands, entered via DDE-compliant application 66, to CNC module 13 or even a networked CNC, such as CNC 44. The various modules 68–73 permit workstation 20 to monitor and/or control a resident CNC as well as networked CNCs, and further to utilize a logic engine executing on the operating system of personal computer 24 in cooperation with CNC module 13. Further, other networked devices, such as computer 48, potentially an control and/or monitor resident CNC module 13 as well as other networked CNCs. It should be noted that logic applications preferably communicate with CNC module 13 using WindowsNT™ kernel objects, such as shared memory objects and named events.

With respect to networked CNCs and as generally illustrated in FIGS. 3 and 4, communication data is organized in packets, appropriate for a given network, that are properly addressed and transmitted over network 40 to the desired device, e.g. CNC 44. Thus, the motion of a machine, such as machine 22 or machine 46, may be affected and monitored via standard PC 24 (or other PC) utilizing a conventional Windows-based operating system.

The interactivity between the CNC executive 14 and the logic engine 16 can occur in a variety of forms, depending on the overall design of CNC system 12, the part programs to be executed, and the specific logic applications utilized. Generally, however, the control system utilizes the CNC executive 14 for controlling execution of motion control part program blocks. Each of these part program blocks potentially is subjected to the control of a logic engine that ultimately decides whether it is appropriate for a given part program block to be executed. Thus, in some CNC systems 12, the minimum block cycle time of a CNC system may be limited by the scan frequency of its logic engine 16. In other systems, greater efficiency may be accomplished by allowing execution of some part program blocks asynchronously with respect to the scan frequency of the CNC system logic engine.

As described below, CNC system 12 may utilize a new block execution mode referred to as the synchronous/asynchronous/auto-synchronous block execution mode, as described in U.S. Pat. No. 6,401,005 issued Jun. 4, 2002, entitled Programmable Synchronous and Asynchronous Block Execution For A Computer Numerical Control that is commonly assigned. This explanation of a specific example of the cooperation between CNC executive 14 and logic engine 16 should not be construed as limiting. A wide variety of systems and designs can benefit from the use of a logic engine 16 able to execute under the operating system of a personal computer.

In the exemplary embodiment, however, the synchronous, asynchronous and auto-synchronous mode may be programmed as often as desired throughout a given part program to facilitate changing between synchronous operation, asynchronous operation and auto-synchronous operation. The auto-synchronous operation refers to a mode in which the system automatically selects whether a given part program block is executed synchronously or asynchronously depending on the content of a specific part program block.

When motion is executed asynchronously with the logic engine 16, the part program blocks may execute at a rate faster than the logic engine's scan frequency. On the other hand, when part program blocks are executed synchronously with the logic engine, the logic engine is able to control the execution of each block. For example, each part program control block may have a pre-block and a post-block section at which the logic engine can halt execution of the program block. The auto-synchronous execution of part program blocks allows a given block to be executed either synchronously or asynchronously as a function of the content of the part program block. For example, blocks that do not contain S, T, or M codes or time dependent paramacro statements are executed asynchronously, whereas blocks that contain one of these functions are executed synchronously with the logic engine.

Figure 5:
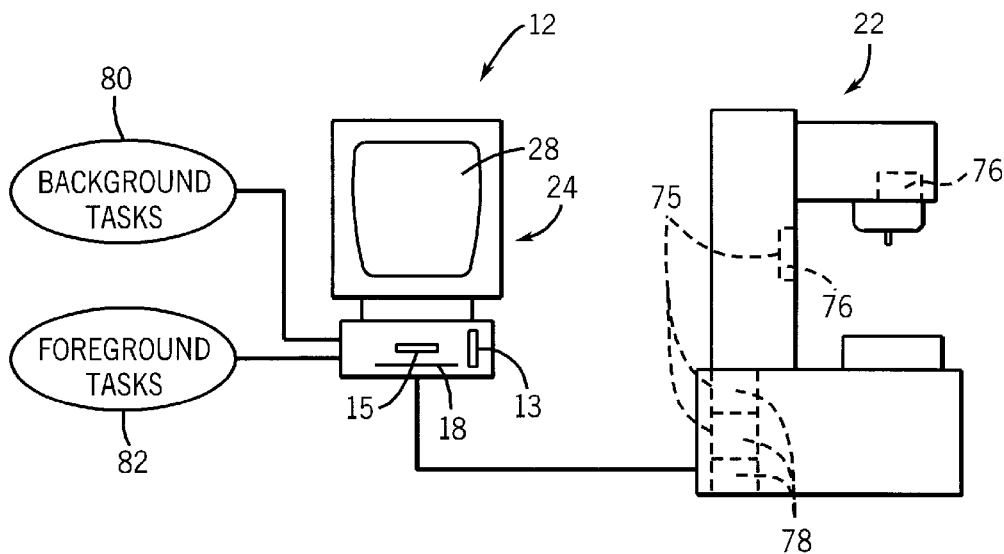
FIG. 5 is a schematic view of a computer numerical control coupled to a motion control device.

Referring generally to FIG. 5, CNC system 12 is shown coupled to controlled machine 22. CNC system 12 may control and monitor the activity of machine 22 via a plurality of devices 75, such as sensors 76 and servos 78, e.g. axes servos.

In an exemplary CNC system 12, CNC software contains many tasks for performing various CNC functions. These tasks typically belong to two groups, referred to as the background task group 80 and the foreground task group 82. The background task group 80 performs such functions as part program block management, block decoding and block set up, block execution and block control, various display functions, communications with a personal computer, diagnostics, etc. The foreground task group 82, on the other hand, performs functions such as interpolation, communication with the axes servos and spindles and communication with the logic engine module. CNC system 12 is able to handle such foreground tasks more efficiently.

Figure 6:
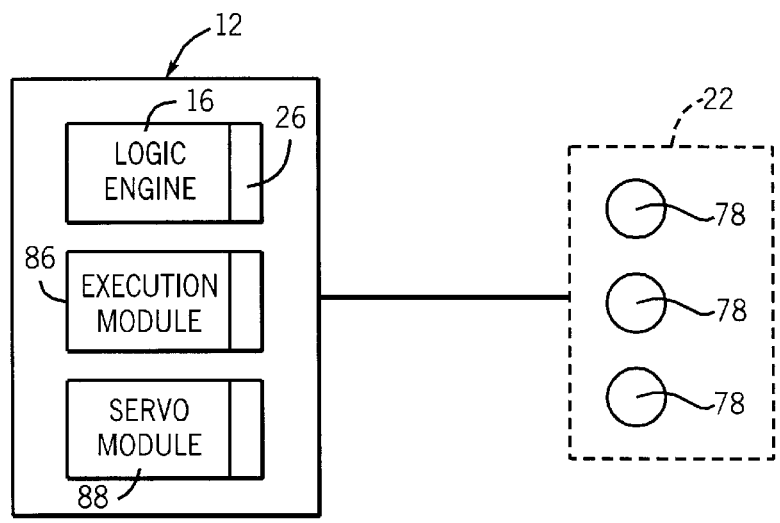
FIG. 6 is a schematic view of the computer numerical control system of FIG. 5 illustrating additional components of the system.

As illustrated in FIG. 6, CNC system 12 may include separate logic engine 16, a program block execution module 86 and a servo module 88. Typically, logic engine 16 comprises logic processor 26 coupled to a processor of block execution module 86. The block execution processor is part of the CNC executive 14 responsible for controlling the transfer of data between CNC system 12 and machine 22.

Figure 7:
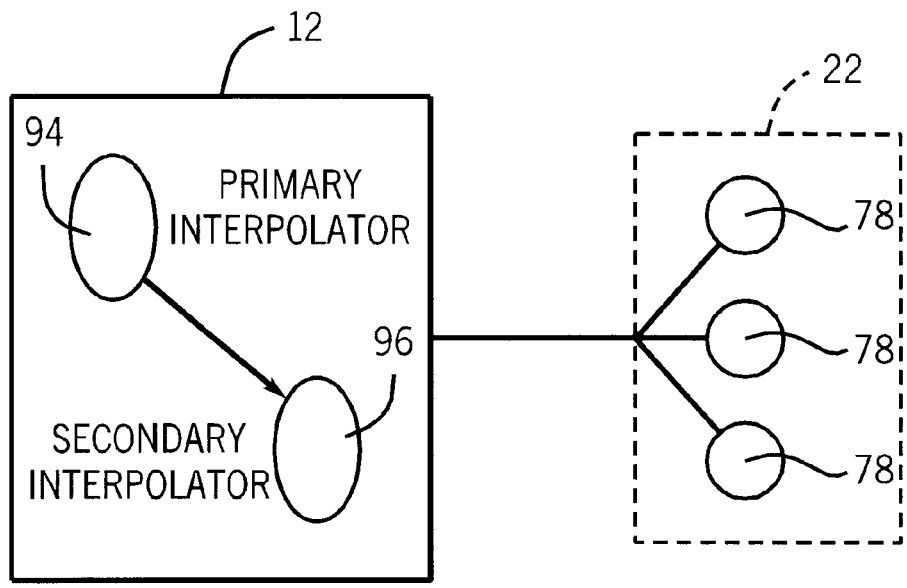
FIG. 7 is a schematic view of the system of FIG. 1 illustrating additional components of the system.

In the preferred embodiment illustrated in FIG. 7, CNC system 12 utilizes at least two interpolators, a primary interpolator 94 and a secondary interpolator 96. Furthermore, CNC system 12 utilizes at least two scan time intervals, a fine foreground scan time interval of the block execution processor of CNC executive 14 and a foreground logic scan time interval of logic processor 26. Preferably, the fine foreground scan frequency is selectable, such that the fine foreground scan time for each cycle can be selected in a range from approximately 2 milliseconds to approximately 40 milliseconds. The foreground logic scan frequency may also be variable, and the preferred foreground logic scan time interval is in the range from approximately 2 milliseconds to 40 milliseconds.

It should be noted that in the preferred embodiment the foreground logic scan time interval is a multiple of the fine foreground scan time interval, and in the example provided, the multiple ranges from one to twenty (1–20). CNC system 12 permits the selection of both the fine foreground scan time interval and the foreground scan multiplier, e.g. a multiple from one to twenty. The multiplier and the fine foreground scan interval are selected such that the foreground logic scan time interval falls in the pre-established range from approximately two milliseconds to approximately 40 milliseconds.

Primary interpolator 94 is executed either in the foreground logic scan time interval or in a shorter fine foreground scan time interval depending on the program block execution mode, e.g. synchronous or asynchronous. Secondary interpolator 96, on the other hand, divides the output of the primary interpolator 94 into portions that are given to servos 78. The number of portions is equal to the foreground scan multiplier if the primary interpolator is being executed at the foreground logic scan time interval. However, if the primary interpolator 94 is executed in the fine foreground scan time interval, no subdivision of primary interpolator output is required.

The primary interpolator and associated motion functions, i.e. main foreground motion functions, are typically executed in the fine foreground scan time interval when CNC system 12 is operated in an asynchronous mode. These functions, however, are executed in the foreground logic scan time interval when CNC system 12 is in a synchronous block execution mode.

When CNC system 12 is in synchronous block execution mode, the primary function to be performed in the foreground logic scan interval is communication between logic processor 26 and the CNC executive 14 responsible for executing the part program blocks. For example, spindle functions and axis movements generated by logic engine 16 are executed once per foreground logic scan time interval. However, if CNC system 12 is in an asynchronous mode, the program blocks (e.g. motion blocks not controlled by the logic engine 16) can be executed in the fine foreground scan time interval at a faster rate than otherwise possible when under the control of logic engine 16.

As explained above, the exemplary CNC system 12 utilizes three logic/block execution synchronization modes. A first mode is a synchronous logic mode 98 (see FIG. 8) in which logic engine 16 is fully synchronized with block execution carried out by CNC executive 14. In this mode, all part program blocks, including motion, non-motion and hybrid blocks (blocks containing both motion and non-motion data) are fully synchronized and limited by the foreground logic scan frequency. In an asynchronous mode 100, the operation of logic engine 16 and the execution of part program blocks are completely asynchronous. In this mode, all part program blocks, including motion blocks, non-motion blocks and hybrid blocks are executed completely asynchronously. In other words, part program blocks, such as most motion blocks, can be executed based on a shorter fine foreground scan time interval at a higher fine foreground scan frequency while the logic engine 16 is permitted to act independently of the block execution module of CNC executive 14. However, the logic engine scan rate can be made equal to the block execution rate when in asynchronous mode.

An auto-synchronous mode 102 is a hybrid of the synchronous mode and the asynchronous mode. In this mode, for example, both non-motion blocks and some hybrid motion blocks are fully synchronized with logic engine 16 and their execution is limited to the logic scan time interval. However, other part program blocks with motion may be executed asynchronously with respect to the logic. By way of example, part program blocks that include S, T and M codes, time dependent paramacro functions, fixed cycles or solid tapping typically are automatically executed in sync with logic engine 16 when CNC system 12 is in the auto-synchronous mode.

Figure 8:
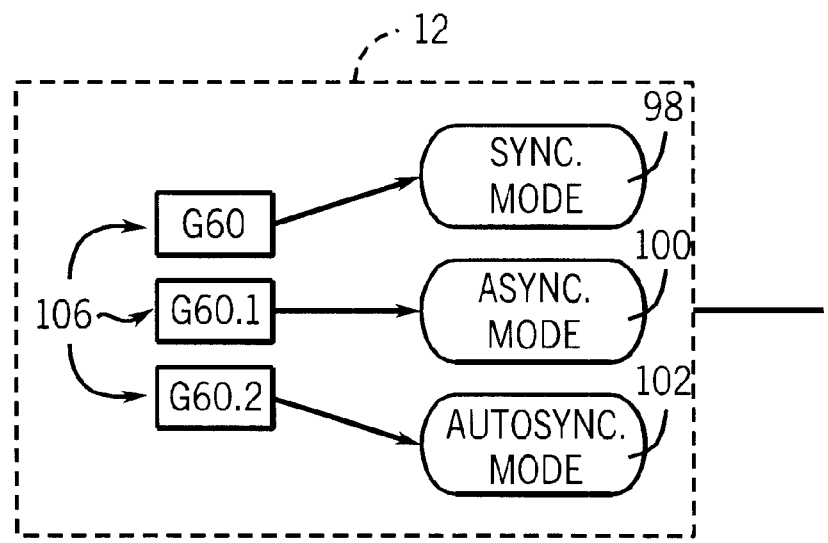
FIG. 8 is a schematic view representing mode changes of the system illustrated in FIG. 5.

Changes from one mode to another are affected by a synchronization control parameter 106, as illustrated in FIG. 8. Preferably, synchronization control parameter 106 is a designated code that is recognized by logic engine 16 and CNC executive 14. The designation code may be programmed into the particular motion control program being executed. Mode changes between the three synchronization odes are performed in non-motion blocks contained in the art program and automatically change the mode of operation hen read by CNC system 12. Synchronized control parameters 106 may comprise three unique machine control codes, known as G codes. For example, a G60 code can be used and recognized by CNC system 12 as the code for initiating a change to synchronous mode 98 (see FIG. 8). Similarly, G60.1 may be used as the synchronization control parameter that initiates a change to asynchronous mode 100. Additionally, a synchronization control parameter, such as G60.2 can be used to initiate change to auto-synchronous mode 102.

During synchronous operation, each part program block contains a pre-block, a block execution and a post-block phase that is usable by the logic engine 16. The logic engine is able to control and hold execution of the subject block in any of these three phases, as is known to those of ordinary skill in the art. This aspect is similar to that in typical existing CNCs, such as the 9/Series CNC available from Allen-Bradley Company, L. L. C., located at 1201 South Second Street, Milwaukee, Wisc. In the asynchronous mode, however, the CNC executive 14 forces the part program execution to stop and provides an error message if, for example, a pre-block or post-block request is received from logic engine 16. In this event, the condition causing the error message must be cleared before execution of the part program can be resumed. It should be noted that non-motion "setup-type" blocks may be executed as fast as possible in asynchronous mode. In other words, execution of such blocks is not limited by the communication time between the CNC and the servo subsystem.

In the auto-synchronous mode, part program blocks are executed as if the system is in synchronous or asynchronous mode, depending on the content of the block. For example, most motion blocks are executed as if the control is in asynchronous mode, while most non-motion blocks are executed as if the control is in synchronous mode. For clarification, motion blocks generally are defined as those program blocks that have a moving axes bit pattern set, regardless of whether the motion is programmed in a motion control block of the part program or generated by CNC system 12.

Figure 9:
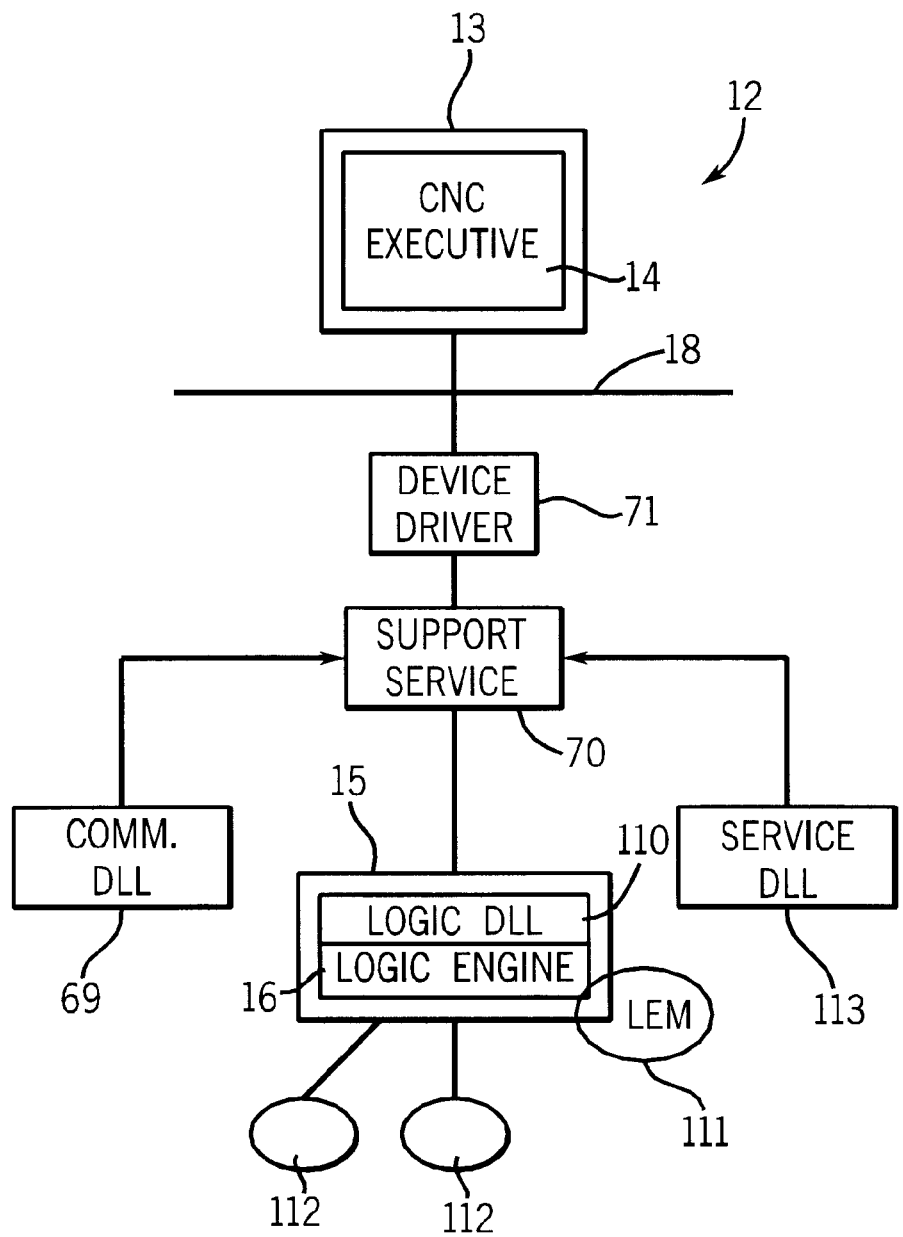
FIG. 9 is a schematic illustration of a specific design layout of a logic engine coupled to a CNC executive, according to a preferred embodiment of the present invention.

The design and functionality of the CNC executive and logic engine based on a personal computer operating system an be better understood with reference to the exemplary embodiment illustrated in FIG. 9. In this embodiment, CNC executive 14 is coupled to logic engine 16 by a PCI bus, referenced as data communication link 18.

Logic module 15 cooperates with a logic application program interface (API) 110, such as a logic dynamic link library (DLL). Logic engine 16 is coupled through logic DLL 110 to support service 70 and device driver 71 to permit communication with CNC executive 14 across communication link 18, e.g. PCI bus 18. It should be noted that other modules, such as communication module 69 and a service DLL 113, also can be coupled to support service 70 for communication with CNC executive 14.

In an exemplary embodiment, logic engine 16 and logic DLL 110 execute under a personal computer operating system, such as a Windows-based system, and most preferably under a WindowsNT™ operating system. In such an exemplary embodiment, a Windows-based logic engine is readily integrable with the CNC logic API, such as logic DLL 110. Other logic engines, such as the SoftLogix5 logic engine available from Rockwell Software, Inc. are also available. With some logic engines, such as the SoftLogix5 software, it may be necessary to utilize a library extension module (LEM) 111 to facilitate communication between the logic engine 16 and the logic API 110.

By utilizing a logic engine and API able to execute under a standard operating system of a personal computer, a wider variety of logic tools can be designed to interface with a CNC, including CNC executive 14. The logic API facilitates the use of a wide variety of applications 112, including logic editors, compilers, interpreters, and monitors.

In the exemplary illustrated embodiment, logic DLL 110 communicates with support service 70 through named pipes. The support service, in turn, has threads that support the logic API 110. Support service 70 communicates the requests from the logic DLL 110 to CNC executive 14 through device driver 71, e.g. the 9/PC kernel mode driver discussed above.

In the preferred embodiment, the only interface with CNC executive 14 is through the open logic API, e.g. logic DLL 110. Therefore, the logic engine operation must be synchronized with that of the CNC, at least for all "time critical" functions.

As discussed above, the operation of logic engine 16 and logic DLL 110 is connection based and logic requests are channeled through support service 70. Support service 70 preferably is designed as the creator of named pipes while logic DLL 110 acts as the client of the named pipes.

A particular logic application, e.g. logic engine 16, may open a communication channel with CNC executive 14 by a function call. This call establishes a connection between the logic engine 16/logic DLL 110 and support service 70 for transacting logic data with CNC executive 14. The logic DLL initiates this sequence by attaching a set of pipes that establish a connection with the support service for transactions between logic engine 16/logic DLL 110 and CNC executive 14. The logic DLL 110 creates a thread to service this connection. The thread is established for returning replies from support service 70 to the logic API, e.g. logic DLL 110, through the appropriate pipe.

Packets that elaborate a request are sent from the logic DLL 110 to support service 70 through a specific pipe. Each request has a corresponding reply that arrives at logic DLL 110 from support service 70 via a pipe, and that connection is serviced by a callback thread. Some function calls send the request to the support service and "block" on the arrival of the reply, while other function calls submit he request to support service 70 and continue operations, such that the calling application does not block on the function.

The arrival of the reply sets a status indicator in the logic DLL's connection management data. Also, the asynchronous arrival of the reply is facilitated by allocating space for the reply and creating a mutex object on which the logic DLL waits for the reply. Handles for the reply memory allocation and mutex object are sent as part of the request. The specific callback thread that receives the reply, copies the reply packet from the pipe into the allocated memory and signals the mutex object. This permits the calling function to wait and synchronize with the reply for continued operation.

Figure 10:
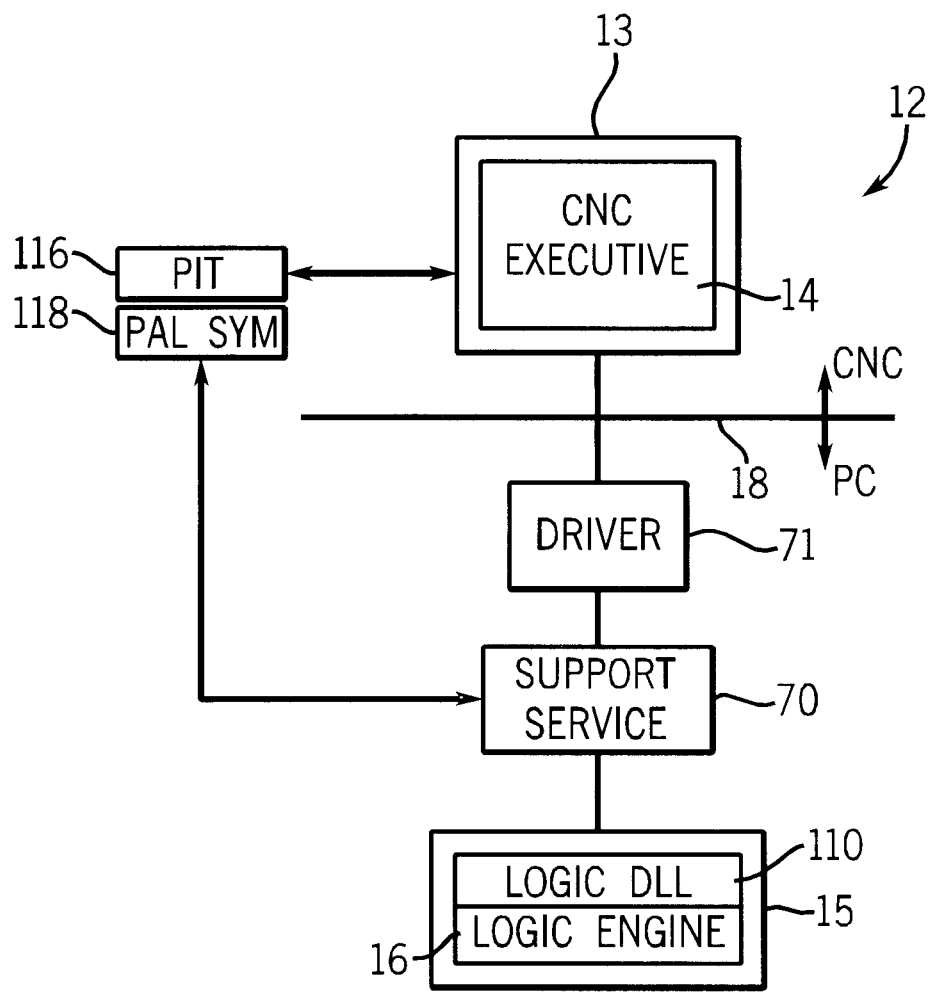
FIG. 10 is a schematic illustration illustrating components of the CNC executive accessed by the logic engine, illustrated in FIG. 1.

As illustrated in FIG. 10, the logic module 15 provides access to two important components of CNC system 12 that cooperate with CNC executive 14. Specifically, a programmable application logic interface table (PIT) 116 is in communication with both CNC executive 14 and logic API 110. The PIT 116 comprises a memory location that the CNC executive 14 reads from and writes to at the time a part program is set up and run. A programmable application logic (PAL) symbol file 118 also cooperates with the CNC executive 14 and logic API 110 to define the meaning of each byte in the PIT 116. Various types of logic applications require access to one or both of the PIT 116 and the PAL symbol file 118. The functions that allow access to PAL symbol file 118 provide the logic DLL 110 a method for defining the meaning of data in the PIT shared with CNC executive 14.

In operation, logic execution functions provide the interface between CNC executive 14 and logic engine 16. Generally, there are two types of logic interfaces for handling foreground logic and background logic. For foreground logic, logic engine 16 registers a callback function to be executed or an event to be triggered when CNC executive 14 requires foreground logic execution. In this instance, the logic engine also returns a shared memory name to be used by the logic engine for accessing the CNC PIT 116. Also, when executing foreground logic, the logic engine 16 and CNC executive 14 should be synchronized. If the logic execution is not able to complete within the configured logic scan rate of the CNC, the CNC will be forced to an emergency stop.

With background logic, logic engine 16 determines the ace of execution of the background logic scan. The logic API 110 provides logic engine 16 with registration functions for the background logic and also controls the transfer of CNC PIT images between the CNC executive 14 and the background logic application.

For example, during foreground task execution on CNC executive 14, CNC executive 14 initially requests an interrupt to the personal computer 24 across PCI bus 18 to execute a synchronized logic program under, for example, WindowsNT™. Prior to making this request, the CNC executive 14 updates the PIT image 116 with current data from the CNC executive's 14 logic interface data. The device driver 71 intercepts the logic execution request and schedules logic engine 16, e.g. SoftLogix5, to perform registered logic operations for CNC executive 14. Once the logic program is completed, changes to the CNC logic interface are transmitted to CNC executive 14 via DMA transfers initiated by a PCI interrupt from the CNC device driver 71 to CNC executive 14. The above-described connectivity between an open PC-based logic module 15 and a CNC module 13, and the ability of the CNC executive 14 and logic engine 16 to readily communicate via the PIT and PAL symbol file permit CNC synchronized logic execution under a personal computer operating system.

It will be understood that the foregoing description is of a preferred exemplary embodiment of this invention and that the invention is not limited to the specific forms shown. For example, a wide variety of logic engines and applications, CNC executives, communication links and components may be utilized in the described system. These and other modifications may be made in the design and arrangement of the elements described above without departing from the scope of the invention as expressed in the appended claims.

What is claimed is:

1. A computer numerical control system for controlling and monitoring machine motion, comprising:
   a CNC executive running on a separate PCI card coupled to a bus in a personal computer; and
   a personal computer having a logic engine executing under an operating system of the personal computer, wherein the logic engine is coupled to the CNC executive as its only logic engine such that a logic application can be executed in synchronization with the CNC executive.

2. The computer numerical control system as recited in claim 1, wherein the bus comprises a PCI bus.

3. The computer numerical control system as recited in claim 1, wherein the CNC executive is coupled to the logic engine across a network.

4. The computer numerical control system as recited in claim 3, wherein the network comprises an Ethernet network.

5. The computer numerical control system as recited in claim 1, wherein the operating system comprises a workstation-based operating system.

6. The computer numerical control system as recited in claim 1, wherein the operating system comprises a Windows™-based operating system.

7. The computer numerical control system as recited in claim 6, wherein the Windows-based operating system is a WindowsNT198 operating system.

8. A system for controlling manipulation of a component, comprising:
   a machine tool connectable to the component;
   a CNC executive coupled to the machine tool to provide commands that control activity of the machine tool in manipulating the component; and
   a logic engine capable of executing under a personal computer operating system and disposed in communication with the CNC executive across a bus to provide all logic functionality for the CNC executive.

9. The system as recited in claim 8, wherein the personal computer operating system comprises a workstation-based operating system.

10. The system as recited in claim 8, wherein the personal computer operating system comprises a Windows™-based operating system.

11. The system as recited in claim 10, wherein the Windows™-based operating system comprises a windowsNT™ operating system.

12. The system as recited in claim 8, wherein the bus comprises a PCI bus.

13. The system as recited in claim 8, wherein the CNC executive and the logic engine are resident at a single workstation.

14. The system as recited in claim 8, wherein the CNC executive and the logic engine are able to communicate across a network.

15. A method for executing a part program on a machine, comprising:
   utilizing a logic application based on a personal computer operating system;
   providing a CNC executive on a separate PCI card, the CNC executive being capable of executing at least a portion of the part program; and
   synchronizing the execution of the logic application with the execution of the part program.

16. The method as recited in claim 15, further comprising executing the part program to control motion of the machine with respect to a component.

17. The method as recited in claim 15, wherein utilizing includes utilizing a workstation-based logic application.

18. The method as recited in claim 15, wherein utilizing includes utilizing a Window™-based logic application.

19. The method as recited in claim 15, further comprising executing the logic application on a logic engine resident on a personal computer.

20. The method as recited in claim 15, further comprising coupling the logic engine to the CNC executive across a bus.

* * * * *